Patented Sept. 16, 1930

1,776,154

UNITED STATES PATENT OFFICE

ANGELO KNORR, OF BERLIN, AND ALBERT WEISSENBORN, OF POTSDAM, GERMANY, ASSIGNORS TO WINTHROP CHEMICAL COMPANY, INC., OF NEW YORK, N. Y., A CORPORATION OF NEW YORK

DI-ISOPROPYL CARBONYL COMPOUNDS

No Drawing. Application filed July 5, 1928, Serial No. 290,693, and in Germany July 7, 1927.

The present invention relates to the new aromatic di-isopropyl-carbonyl compounds of the general formula

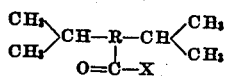

R being an aromatic radicle and X meaning hydrogen or an univalent radicle.

These componds are very valuable perfumes of a profoundly different character of the odor as compared with the odor of perfumes which contain no or only one isopropyl group. The odor generally spoken is similar to that of musk grain oil.

The new compounds may be obtained for instance by introducing by any known method a carbonyl group into an aromatic hydrocarbon containing two isopropyl groups. They may also be manufactured by simultaneously introducing an isopropyl group and a carbonyl-group into a mono-isopropyl-aryl compound or by converting an aromatic carbonyl compound which contains no or only one isopropyl group into the corresponding di-isopropyl compound. In carrying out these reactions for example as starting material there may be used aromatic hydrocarbons substituted by one or three isopropyl groups; on account of splitting or condensation reactions di-isopropyl compounds are formed being substituted by the carbonyl-group.

The following examples, the parts being by weight, illustrate without limiting the invention in what manner the new compounds can be manufactured.

*Example 1.*—Into 15 parts of di-isopropyl-benzene of boiling point 204 to 208° C. are introduced 10 parts of aluminium chloride and 1 part of cuprous chloride. Carbonmonoxide is passed through the mass at ordinary or raised temperature until no further gas is absorbed. There is thus obtained di-isopropyl-benzaldehyde

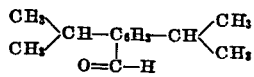

of boiling point 147 to 153° C. at 12–13 mm. pressure, in the form of a thick, colorless liquid.

The operation may be conducted at ordinary or raised pressure with or without the aid of gaseous hydrochloric acid.

*Example 2.*—To a solution of 15 parts of 4-isopropylbenzaldehyde (cuminic aldehyde) and 10 parts of 2-chloropropane (isopropyl-chloride) in 30 parts of carbon bisulfide, there are added in portions at 15–20° C. 20 parts of aluminium chloride. The whole is heated for some time at 40° C. By working up the mixture in known manner there is obtained a good yield of di-isopropyl-benzaldehyde mentioned in Example 1.

*Example 3.*—15 parts of isopropyl-benzene (cumene) are mixed with 10 parts of aluminium chloride and 1 part of cuprous chloride. Into this mixture carbon monoxide is introduced until no more is taken up. When the mass is worked up there is obtained in good yield di-isopropyl-benzaldehyde mentioned in Example 1 besides unchanged isopropyl-benzene and benzene formed by a splitting reaction.

*Example 4.*—15 parts of tri-isopropyl-benzene of boiling point 120–125° C. at 13 mm. pressure are treated with carbon monoxide at 50–60° C. under an increased pressure in the presence of 9 parts of aluminium chloride and 1 part of cuprous chloride. The thick redbrown reaction product is distilled in a vacuum. There is mainly obtained the di-isopropyl-benzaldehyde mentioned in Example 1.

*Example 5.*—15 parts of di-isopropyl-toluene of boiling point 100–104° C. at 9 mm. pressure are treated with carbon monoxide under an increased pressure in the presence of 9 parts of aluminium chloride and 1 part of cuprous chloride. When worked up the mass yields di-isopropyl-methylbenzaldehyde

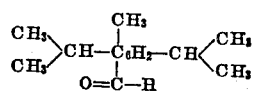

in the form of a colorless oil boiling at 148–150° C. under 9 mm. pressure.

*Example 6.*—16 parts of 1-isopropyl-4-methylbenzene are treated with carbon monoxide at 50–60° C. and an increased pressure in the presence of 9 parts of aluminium chloride and 1 part of cuprous chloride. When distilled in a vacuum from the mass is obtained besides unchanged isopropyl-toluene and besides toluene and di-isopropyl-toluene formed during the reaction as the main constituent of the mixture the di-isopropyl-methylbenzaldehyde mentioned in Example 5.

*Example 7.*—15 parts of di-isopropyl-xylene of boiling point 110–115° C. at 8 mm. pressure are treated with carbon monoxide at an increased pressure in the presence of 9 parts of aluminium chloride and 1 part of cuprous chloride. The mixture is worked up and with a good yield di-isopropyl-di-methyl-benzaldehyde.

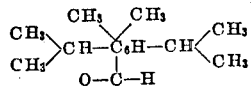

is obtained, a colorless oil boiling at 150–155° C. under a pressure of 9 mm.

*Example 8.*—15 parts of di-isopropyl-ar-tetrahydronaphthalene of boiling point 143–148° C. at 9 mm. pressure are treated with carbon monoxide at an increased pressure in the presence of 9 parts of aluminium chloride and 1 part of cuprous chloride. From the mixture there is obtained a good yield of di-isopropyl-ar-tetrahydronaphthaldehyde

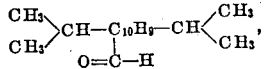

a colorless compound having a waxlike consistence at ordinary temperature and boiling at 182–185° C. at 9 mm. pressure.

*Example 9.*—10 parts of di-isopropyl-benzene of boiling point 204–208° C. are mixed with 5 parts of acetyl-chloride, 7 parts of aluminium chloride are added at 12–15° C. and the mixture is warmed for 2–3 hours at 50° C. By distillation in a vacuum with a good yield there is obtained di-isopropyl-acetophenone

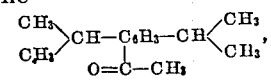

a colorless oil boiling at 145–150° C. at 13 mm. pressure.

As a di-isopropyl compound containing the carbonyl-group in the side chain 1-carbonyl-2-methyl-2-(isopropyl-phenyl)-ethane may be mentioned. The aromatic di-isopropyl-carbonyl compounds by reactions may be transformed into other perfumes by chemical conversion of the carbonyl group. Thus for instance from di-isopropyl-benzaldehyde by alkaline condensation with acetone di-isopropyl-benzal-aceton is obtained; by oxidation di-isopropyl-benzaldehyde yields di-isopropyl-benzoic acid and from this acid the corresponding esters may be made; di-isopropyl-benzaldehyde by catalytic or any other reduction is converted into di-isopropyl-benzylalcohol, from which for example the corresponding acetate is obtainable. By condensation of di-isopropyl-benzaldehyde with acet-aldehyde or its homologues 1-carbonyl-3-(di-isopropyl-phenyl)-propen-2 or its homologues are prepared, which may be transformed into 1-hydroxy-3-di-isopropyl-phenyl)-propane or homologues thereof.

What we claim is:—

1. The new aromatic di-isopropyl-carbonyl compounds of the general formula

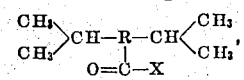

R being an aromatic radicle and X meaning hydrogen or an univalent radicle.

2. The new aromatic di-isopropyl-carbonyl compounds of the general formula

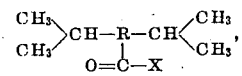

R being a radicle of the benzene series and X meaning hydrogen or an univalent radicle.

3. The new di-isopropyl-benzaldehyde

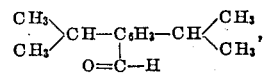

being a thick colorless liquid of boiling point 147–153° C. at 12–13 mm. pressure.

In testimony whereof, we affix our signatures.

Dr. ANGELO KNORR.
Dr. ALBERT WEISSENBORN.

CERTIFICATE OF CORRECTION.

Patent No. 1,776,154.  Granted September 16, 1930, to

ANGELO KNORR ET AL.

It is hereby certified that error appears in the above numbered patent requiring correction as follows: In the grant, and in the heading to the printed specification, title of invention should read "Aromatic Di-Isopropyl-Carbonyl Compounds" instead of Di-Isopropyl Carbonyl Compounds; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.